United States Patent

[11] 3,571,899

[72] Inventor John C. Sobieski
 Russell, Ohio
[21] Appl. No. 811,884
[22] Filed Apr. 1, 1969
[45] Patented Mar. 23, 1971
[73] Assignee General Electric Company

[54] MANUFACTURE OF METAL FOIL LEADS
 11 Claims, 12 Drawing Figs.
[52] U.S. Cl. .................................................. 29/412,
 29/193.5, 29/417, 113/119
[51] Int. Cl. ................................................ B23p 17/00
[50] Field of Search ........................................... 29/412,
 414, 417, 193, 193.5; 113/119; 313/112, 217, 331,
 332, 333, 317; 156/8

[56] References Cited
 UNITED STATES PATENTS
2,610,390 9/1952 Locke ........................... 113/119X
2,667,595 1/1954 Noel et al. ..................... 29/193X
3,469,953 9/1969 St. Clair et al. ................ 29/193.5

Primary Examiner—John F. Campbell
Assistant Examiner—Victor A. DiPalma
Attorneys—James J. Lazna, Henry P. Truesdell, Frank L. Neuhauser, Oscar B. Waddell and Melvin M. Goldenberg ABSTRACT: Metal foil leads for sealing into vitreous material are made by forming a metal foil ribbon into a series of successive foil lead sections joined together by narrow connecting portions and having their edges feathered by etching, and then transversely severing the ribbon at the connecting sections to separate it into individual metal foil leads.

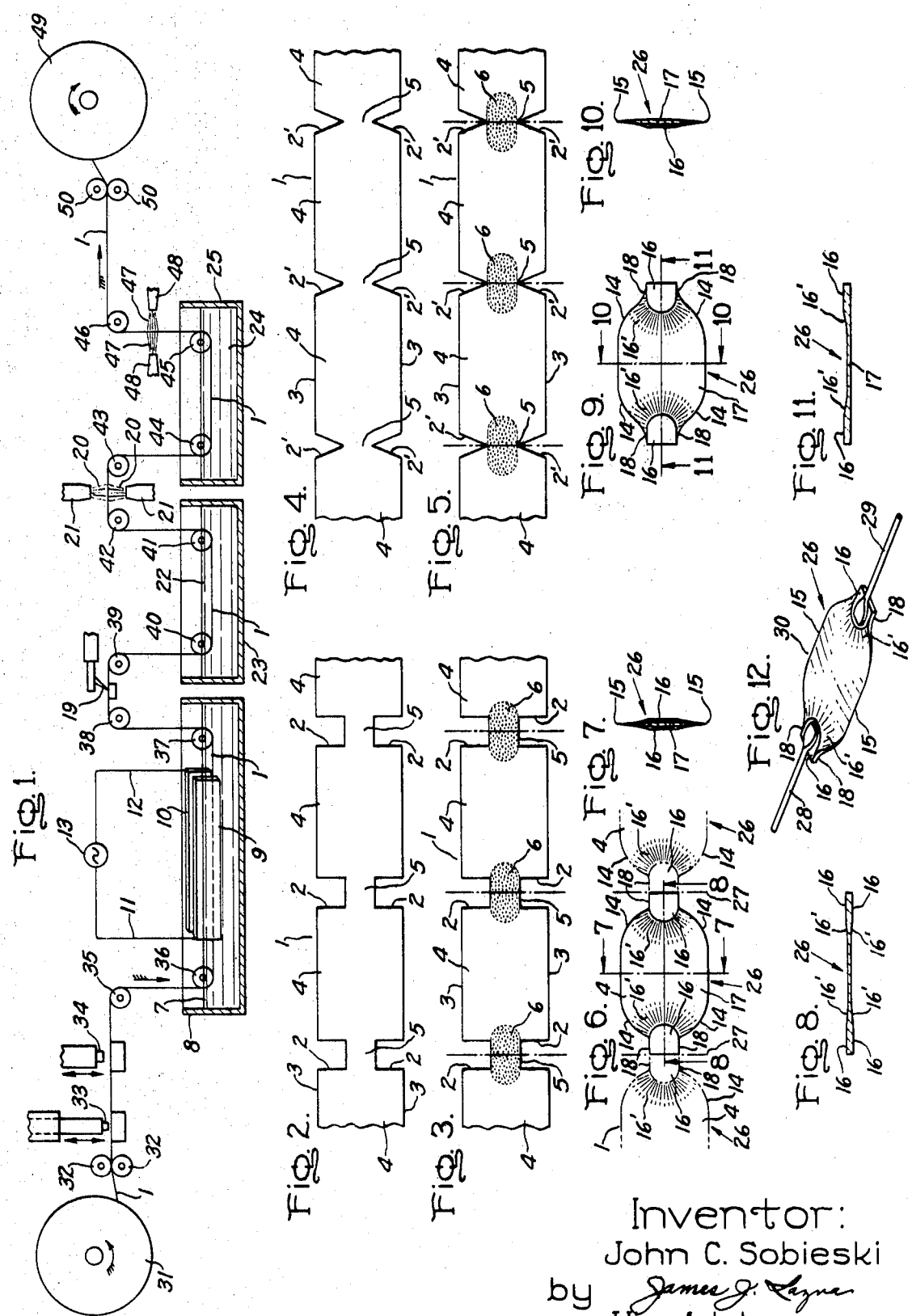

MANUFACTURE OF METAL FOIL LEADS

BACKGROUND OF THE INVENTION

Field of the Invention

This invention relates to the manufacture of metal foil or ribbon leads for sealing into vitreous envelopes of quartz or fused silica or of quartzlike high temperature glasses, as in lamp manufacturing.

In making a hermetic seal of a metallic conductor into a lamp envelope made of fused quartz or a quartzlike glass such as 96 percent silica glass, the very high temperatures required for softening and fusing the quartz restricts the choice of metals available for sealing thereinto in practice to molybdenum and tungsten both of which metals have coefficients of expansion much greater, e.g., as much as ten times greater than quartz. To avoid cracking the quartz at the seal upon cooling, the lead-in conductor is shaped, at least over the hermetically sealed portion thereof, as a thin ribbon or foil. The metal foil seal portion of the conductor, having become bonded to the quartz at a relatively high temperature, will merely go into tension without rupturing when the quartz cools, and cracking or shaling of the quartz at the seal is thereby avoided.

For effective sealing into quartz, the metal ribbon or foil should have a width to thickness ratio of at least about 100 to 1, and in the case of the thicker ribbons or foils they should taper down in thickness to the sides at a taper angle not exceeding about 5° to the edges. Metal ribbons or foils having such cross-sectional shape can be made either by longitudinally rolling a central portion of a length of molybdenum wire as described, for example, in U.S. Pat. No. 2,667,595, Noel et al., or by electrolytically etching a ribbon of metal foil. The longitudinally rolled one-piece molybdenum wire leads are particularly suitable for lower currents. For higher currents, or where heavier electrodes or wire leads have to be supported by the metal ribbons or foils during the sealing-in process, the etched metal foils are preferred. Up to the present time, such etched metal foils have generally been produced by electrolytically etching a strip or ribbon of the metal foil of a few millimeters or so in width to feather the side edges thereof, and then cutting the etched foil ribbon or strip into individual foil leads of the proper length required for the seal. An outer wire lead, and either an inner wire lead or an electrode support wire, are then welded to the opposite cut ends of each individual foil lead to thereby form a complete welded ribbon lead-in conductor assembly for sealing into a quartz lamp envelope.

The cutting of the individual etched foil leads from the etched metal foil strip or ribbon ordinarily leaves a burr along the cut edges of each metal foil lead. Owing to the fragility and comparatively small size of these thin metal foil leads, the removal of the burrs from their cut edges is a very difficult and impractical operation. The presence, however, of these burrs along the cut edges of the metal foil leads, together with the appreciable thickness of the metal foil along the cut edges, frequently causes the failure of the seal, the fused quartz eventually cracking adjacent to the cut edges when the seal has cooled down.

Another problem frequently encountered heretofore in the production of etched metal foil leads with welded wire leads is that in the welding of the wire leads to the thin metal foil, the foil is oftentimes burned completely through, thereby resulting in a defective weld. Also, the current carrying capacity of the entire lead-in conductor assembly is limited by that of the thin foil immediately next to the weld.

It has been proposed to overcome the above-mentioned problems by cutting a strip or ribbon of metal foil into individual foil leads of the proper length required for the seal and then electrolytically etching each individual cut foil lead, while supported at each of its cut edges in electrode clamps which shield or mask off localized areas of the foil lead at and adjacent each of its cut edges, to thereby feather all the edges of the foil lead substantially completely therearound except for the masked off areas thereof. Such a formed metal foil lead and fabricating process is disclosed and claimed in copending application Ser. No. 734,910, Fridrich, filed Jun. 6, 1968 and assigned to the same assignee as that of the present applications. The feathering of the edges of the cut metal foil lengths substantially completely therearound during the etching process serves to remove practically all the burrs from the cut edges of the foil lengths which otherwise would be apt to cause the cracking of the quartz at the seal on cooling thereof. In addition, the masking off of localized areas of the cut foil lengths from the etching electrolyte during the etching process serves to leave thicker foil regions at the opposite ends of the foil lead to which the inner and outer wire leads may then be welded without any need for extra tabs to build up the thickness to facilitate welding and prevent the burning through of the metal foil, or to increase the current carrying capacity thereof.

While for these reasons metal foil leads as made by such individually etched process have proven to be much more satisfactory for sealing into quartz than those which are simply cut from an etched ribbon of metal foil and which have undesired burrs and excessive thickness along their cut edges, the requirement for the individual handling and etching of each cut foil length therefore renders these operations inconvenient and time consuming, and makes their production very expensive and uneconomical. Moreover, with such an individual foil length etching process wherein the cut foil length remains stationary within the etching electrolyte during the etching action, the etching electrolyte not only becomes excessively heated by the passage of the electric current therethrough but bubble formation also develops in the electrolyte. As the etching electrolyte heats up, it becomes more reactive and so etches the metal foil at a faster rate. On the other hand, the bubbles which develop in the electrolyte act as a masking medium for the passage of the electric current therethrough so that a variation in the current flow and therefore in the amount of etching occurs during the etching cycle, from one foil length to the next. Because of these variables, therefore, consistently uniform etching of the cut foil lengths and reproducibility of results is unobtainable with such individual foil length etching process.

SUMMARY OF THE INVENTION

It is an object of the invention, therefore, to provide a novel method of making thin metal foil leads having thicker localized areas at its opposite ends and having feathered edges completely therearound except for the thicker localized end areas thereof.

Another object of the invention is to provide a method of making metal foil leads of the character referred to above which is operative to produce such leads economically at a comparatively high production rate and with a high degree of uniformity.

Still another object of the invention is to provide a method of producing a preformed ribbon or strip of metal foil which can be transversely severed at spaced points therealong into individual metal foil leads of the particular form referred to above.

A further object of the invention is to provide a continuous process for forming a ribbon of metal foil into a series of successive lead or seal sections which are joined together at their opposite ends by narrow connecting portions and have their edges feathered completely therearound by etching and which can be separated at their connecting portions into individual metal foil inleads.

Briefly stated, in accordance with one aspect of the invention, a strip or ribbon of thin metal foil such as molybdenum foil is first formed with pairs of opposed notches in its side edges at spaced points therealong to divide the strip or ribbon into a series of individual foil lead sections joined together at their opposite ends by narrow connecting portions, after which discrete protective coatings of an etch-resistant masking material are applied on at least one side of the metal foil strip or ribbon over localized areas thereof between the opposed notches of each pair thereof between the opposed notches of each pair thereof and the metal foil strip or ribbon then electrolytically etched to feather all the exposed edges of the individual foil lead sections, following which the protective coatings are then removed from the etched metal foil strip or ribbon. The so-formed strip or ribbon is then traversely severed, as needed, at its narrow connecting portions to separate it into individual foil leads.

Further objects and advantages of the invention will appear from the following detailed description of species thereof and from the accompanying drawing.

BRIEF DESCRIPTION OF THE DRAWING

In the drawing:

FIG. 1 is a diagrammatic view illustrating a continuous process according to the invention for forming a ribbon of metal foil into a series of individual foil lead sections which may be subsequently separated from one another by cutting;

FIG. 2 is a fragmentary plan view on an enlarged scale of a strip or ribbon of metal foil which has been preformed in accordance with the invention with spaced pairs of opposed U-shaped notches in its side edges;

FIG. 3 is a fragmentary plan view likewise on an enlarged scale of the metal foil strip or ribbon of FIG. 2 showing the protective coatings of an etch-resistant masking material which, in accordance with one form of the invention, are applied onto both sides of the ribbon;

FIGS. 4 and 5 are views similar to FIGS. 2 and 3 but showing a modification of the invention wherein the opposed pairs of notches formed in the side edges of the metal foil strip or ribbon are of V-shape and wherein the protective etch-resistant coatings are applied, in accordance with another form of the invention, onto one side only of the ribbon;

FIG. 6 is a fragmentary plan view on an enlarged scale of the metal foil strip or ribbon shown in FIG. 3 after it has been electrolytically etched in accordance with the invention to feather the exposed edges thereof;

FIG. 7 is a sectional view on the line 7—7 of FIG. 6 of a completed foil lead;

FIG. 8 is a sectional view on the line 8—8 of FIG. 6 of a completed foil lead;

FIGS. 9, 10 and 11 are views corresponding to FIGS. 6, 7 and 8, respectively, and showing a metal foil lead cut from the modified form of metal foil strip or ribbon of FIG. 5 after the electrolytic etching thereof; and FIG. 12 is a perspective view on an enlarged scale of a welded lead-in conductor assembly provided with an etched metal foil lead made in accordance with the invention.

DESCRIPTION OF THE PREFERRED EMBODIMENTS

Referring to the drawings, in producing metal foil leads by the method according to the invention a strip or ribbon 1 of thin metal foil such as, for example, molybdenum or tungsten foil having a thickness of, for instance, around 0.003 to 0.004 inch, is first formed with spaced pairs of opposed notches 2 in its side edges 3 so as to divide the ribbon longitudinally into a series of individual foil lead sections 4 joined together at their opposite ends by narrow connecting portions 5, the pairs of opposed notches 2 for such purpose being spaced apart along the ribbon 1 a distance corresponding approximately to the length desired for the finished metal foil leads. The metal foil ribbon 1 is of a width likewise corresponding approximately to the width desired for the finished metal foil leads. For example, in the particular case illustrated, the metal foil strip or ribbon 1 may have a width of approximately five-sixteenths inch, and the pairs of opposed notches 2 may be spaced apart a distance of around one-half inch or thereabouts. The notches 2 may be of generally U-shape as shown in FIGS. 2 and 3, or of V-shape as shown at 2' in FIGS. 4 and 5, or of any other suitable shape such as to form the constricted or reduced width sections 5 joining together the individual foil lead sections 4.

After the metal foil ribbon 1 has been thus formed with the spaced pairs of opposed notches 2 as described above, discrete protective coatings 6 of a suitable etch-resistant masking material are then applied to the ribbon 1 over localized areas thereof between the opposed notches 2 of each pair thereof, as shown in FIGS. 3 and 5. These etch-resistant protective masking coatings 6 may be applied either to both sides of the metal foil ribbon 1 or to one side only thereof, or successive ones of the coatings 6 may be applied onto alternately opposite sides only of the ribbon 1. The etch-resistant protective masking coatings 6 may be constituted of any suitable material which will resist the etching action of the etchant medium to which the metal foil ribbon 1 is to be subsequently subjected during the etching thereof. For example, where the metal foil ribbon 1 is made of molybdenum and is to be subsequently etched in a sodium hydroxide etching solution, the etch-resistant protective coatings 6 in such case may be composed of a material such as that commercially known as black silicone rubber auto seal flexible adhesive sealant manufactured by applicant's assignee, which material is completely resistant to any etching action thereon by the sodium hydroxide etching solution and which will therefore act to effectively mask the metal foil ribbon 1 from the etching action of such an etching solution. As shown in FIGS. 3 and 5, the localized areas of the metal foil ribbon 1 onto which the protective etch-resistant coatings 6 are applied extend short distance to either side of the transverse center line of the opposed notches 2 of each pair thereof, and in the case where the notches 2 are of U-shape as in FIG. 2, they completely cover the band-shaped constricted connecting portions 5 of the ribbon 1 on at least one side thereof. The material of which the etch-resistant protective coatings 6 are constituted should be sufficiently adherent to the metal foil strip or ribbon 1 to remain firmly in place thereon during the subsequent etching of the ribbon.

Following the application of the etch-resistant protective masking coatings 6 to the metal foil strip or ribbon 1, the latter is then electrolytically etched, as in the manner well known in the art, to feather all the exposed edges of the individual foil lead sections 3 thereof to a sharp edge. The etching of the metal foil strip or ribbon 1 may be conveniently carried out by immersing the strip or ribbon 1 in a bath 7 (FIG. 1) of a suitable etching electrolyte such as, for instance, a 12 percent solution of sodium hydroxide in the case where the metal foil ribbon or strip 1 is constituted of molybdenum, which electrolyte bath 7 is contained within an etching tank 8. The metal foil strip or ribbon 1 is positioned in the electrolyte bath 7 between and in parallel relation to a pair of parallel extending copper bar-type electrodes 9 and 10 which are likewise immersed in the electrolyte bath and which are respectively connected, as by electrical conductors 11 and 12, to the opposite terminals of an AC power source 13. The etching of the metal foil strip or ribbon 1 is continued until all the exposed edges of the individual foil lead sections 4 of the strip or ribbon 1 are feathered to a sharp edge and the corners of the individual lead sections 4 are rounded off, as shown in FIGS. 6 and 9. The length of time during which the metal foil strip or ribbon 1 must be subjected to the electrolytic etching action in order to accomplish the above object will, of course, depend on various factors such as the amperage of the etching current applied to the electrodes 9, 10, the spacing of the metal foil strip or ribbon 1 from the electrodes 9, 10, the composition and temperature of the electrolyte 7 employed, and the composition and thickness as well as width of the metal foil strip or ribbon 1. However, for a molybdenum metal foil strip or ribbon 1 of approximately 0.003 inch thickness and of the particular width referred to above, with its side edges 3 spaced a distance of around one-half inch from the respective electrodes 9, 10, and with an electrolyte 7 at room temperature and composed of a 12 percent solution of sodium hydroxide, an etching time of approximately 7 minutes with an etching current of around 6 amperes applied to the electrodes 9, 10 ordinarily will suffice to accomplish the required degree of etching of the metal foil strip or ribbon 1, as described above.

Etching is most rapid at the edges of the foil lead sections 4 of the strip or ribbon 1 and is a maximum at the corners thereof. This causes the corners to become rounded as indicated at 14 in FIG. 6, and the edges to become feathered to a sharp edge, as illustrated at 15 in FIG. 7. However, etching takes place all over the metal foil strip or ribbon 1 except in the areas masked off by the etch-resistant protective coatings 6 where the etching electrolyte does not have access to the metal foil. This results in thicker areas or plateaus 16 at both ends of each foil lead section 4 of the metal foil strip or ribbon 1, where the etch-resistant protective coatings 6 mask off the narrow connecting sections 5 of the ribbon, these thicker plateau areas 16 remaining at the original thickness of the metal foil strip or ribbon 1, in the case where the masking coatings 6 are applied to both sides of the metal foil strip or ribbon 1 as in FIG. 3, but being reduced to a thickness somewhere around three-fourths that of the original foil thickness in the case where the masking coatings 6 are applied to one side only of the metal foil strip or ribbon 1 as in FIG. 5 From the thicker end plateau areas 16 of each foil lead section 4, the foil thickness taper s gradually down to that of the etched central region 17 thereof, as shown in FIG. 8. Along the medial centerline of each foil lead section 4, the thickness in the central region 17 thereof may be approximately half or somewhat less than half what it is at the thicker end plateau areas 16, as illustrated in FIG. 8. Thus, where the original foil thickness is 0.003 to 0.004 inch, the thickness along the medial line of each foil lead section 4 at its central region 17 after etching may be around 0.001 inch. The thickness of each foil lead section 4 tapers transversely thereof substantially to zero at the edges, as shown at 15 in FIG. 7, except at the shoulders 18 of the thicker end plateau areas 16 where the original foil thickness remains substantially unchanged, or is reduced only to a slight degree, depending on whether the protective masking coatings 6 are applied to both sides, or to one side only, of the metal foil strip or ribbon 1.

Upon completion of the etching operation, the etched metal foil strip or ribbon 1 is withdrawn from the electrolyte bath 7 and the protective masking coatings 6 then stripped off the ribbon 1 in a suitable manner as, for example, by scraping the coatings 6 off the ribbon 1 with a stripper knife 19 (FIG. 1) across the knife edge of which the strip or ribbon 1 is drawn. Any remaining electrolyte on the strip or ribbon 1 is then removed therefrom in a suitable manner, as by washing it off either by directing a water spray 20 against the opposite flat sides of the strip or ribbon 1 from spray nozzles 21 (FIG. 1), or by immersing the metal foil strip or ribbon 1 in a water rinse bath. Preferably, however, the remaining etching electrolyte on the metal foil strip or ribbon 1 is removed therefrom by first immersing the ribbon in a neutralizing acid bath 22 (FIG. 1) contained in a tank 23 to cause the remaining sodium hydroxide etchant, which is a base, to react with the acid to form a salt, and then washing off the resulting reaction product along with any acid or other foreign material remaining on the strip or ribbon 1 in a suitable manner, preferably by directing a water spray 20 from the nozzles 21 against the opposite flat sides of the strip or ribbon 1, followed by immersion thereof in an alcohol rinse bath 24 (FIG. 1) contained in a tank 25, the alcohol absorbing any of the rinse water remaining on the strip or ribbon 1 and being easier to dry off the strip or ribbon than the water alone.

The resulting metal foil strip or ribbon 1 (FIG. 6) which is formed by the above-described processing operations, and which is comprised of a series of etched foil lead sections 4 of the feathered edge form and shape described herein above and joined together at their opposite ends by the narrow but thicker connection portions 5 of the ribbon 1, is then transversely severed at the midpoints of the connecting sections 5, along the cutting planes designated 27 in FIG. 6, to thereby separate the strip or ribbon 1 into individual foil leads 26 (FIGS. 6 to 11) each having the thicker end plateau areas 16 at its opposite ends for welding thereto of inner and outer wire leads 28 and 29 of tungsten or molybdenum to form a completed lead-in conductor assembly 30, as shown in FIG. 12, for sealing into a quartz envelope of an electric lamp in the manner customary in the lamp-making art. Where the protective masking coatings 6 are applied to one side only of the metal foil strip or ribbon 1 prior to the electrolytic etching thereof, the individual foil leads 26 out from the processed foil strip or ribbon 1 will then have the thicker end plateau welding areas 16 on one side only of the foil lead, as shown in FIGS. 10 and 11. On the other hand, where the protective masking coatings 6 are applied to both sides of the metal foil strip or ribbon 1, the resulting foil leads 26 cut from the processed foil strip or ribbon 1 will then have the thicker end plateau welding areas 16 on both sides of the foil lead, as shown in FIGS. 7 and 8, the total thickness of the foil lead at the welding plateaus 16 in such case corresponding to the original thickness of the metal foil strip or ribbon 1 prior to the etching thereof. Foil leads 26 having welding plateaus 16 on both sides of the metal foil are especially suitable for use with inner and outer wire leads 28 and 29 of larger sizes, the added foil thickness serving to prevent the burning through the foil during the welding of the wire leads to the foil lead 26. If even greater foil thickness is desired at the plateau ends 16 of the foil lead 26, the projecting outer end portions of the plateau ends 16 may be doubled back upon themselves prior to the welding thereto the inner and outer wire leads 28 and 29.

While the above-described method according to the invention for making foil leads 26 of the type shown in FIGS. 6 to 11 may be practiced as a batch process wherein individual metal foil strips 1 of determinate length are formed to the desired foil lead shaped sections 4 as shown in FIG. 6 and later cut into individual foil leads 26, it is preferable to practice the described method as a continuous process as shown in FIG. 1 wherein the metal foil strip or ribbon 1 to be processed is in the form of a continuous ribbon thereof which may be contained on a supply spool 31. The continuous ribbon 1 of metal foil on the supply spool 31 may be either preformed with the spaced pairs of opposed notches 2 or 2 (FIGS. 2 and 4), or it may be of plain form unprovided with such notches. If preformed with the notches 2 or 2', the ribbon 1 on the spool 31 may or may not have the protective masking coatings 6 of etch-resistant material preapplied thereto. Where the supply of metal foil ribbon 1 on the spool 31 is of plain unnotched form, it is withdrawn from the spool 31 and guided, as by means of a pair of guide rolls 32 between which the ribbon 1 passes, first to a notching punch 33 which punches the spaced pairs of opposed notches 2 or 2' in the side edges 3 of the ribbon 1, and then past a coating applicator means 34 which applies the protective masking coatings 6 of etch-resistant material either to one side only of the ribbon 1, as specifically shown in FIG. 1, or to both sides of the ribbon, as desired. From the coating applicator means 34, the continuous ribbon 1 of metal foil is then guided, over successive guide rolls 35, 36 and 37, through the etching electrolyte bath 7 in the tank 8 and between and parallel to the parallel extending copper bar electrodes 9 and 10 therein, which are electrically connected by the conductors 11, 12 to an AC power supply 13, to thereby effect the electrolytic etching of the advancing metal foil ribbon 1 to the desired final shaped configuration thereof as shown and described above in connection with FIG. 6. To this end, the rate of movement of the metal foil ribbon 1 through the etching electrolyte bath 7 and the etching time thereof is so adjusted, in relation to the other etching rate control factors such as the etching current, the composition and temperature of the etching electrolyte 7, and the composition, thickness and width of the metal foil ribbon 1 and the spacing of its side edges 3 from the respective electrodes 9, 10, as to effect the required degree of etching of the metal foil ribbon, as described hereinbefore.

From the etching tank 8, the continuous ribbon 1 of metal foil is then guided over a pair of guide rolls 38, 39 past a stripper knife 19 the knife of which is positioned to engage and scrape the protective masking coatings 6 off the advancing ribbon 1. Where the masking coatings 6 are provided on both sides of the ribbon 1, a separate stripper knife 19 is provided on each side of the ribbon for scraping the coatings 6 off the ribbon. Also, in such case, the guide rolls 35, 36, 37 and 38 may be formed with relieved areas in the form of annular grooves therein, in those regions thereof over which the ribbon 1 would normally ride, so as not to engage with and dislodge the coatings 6 off the ribbon prior to its withdrawal from the etching electrolyte 7.

After the removal of the masking coatings 6 from the metal foil ribbon 1, it is then guided over a pair of guide rolls 40, 41 through a neutralizing acid bath 22 in the tank 23 to cause any of the caustic alkali electrolyte 7 (e.g., sodium hydroxide solution) remaining on the ribbon to react with the acid to form a salt. From the neutralizing acid bath 22, the ribbon 1 is then guided over guide rolls 42, 43 past water sprays 20 directed against the opposite flat sides of the ribbon by spray nozzles 21 to wash off the reaction product of the neutralizing acid 22 and electrolyte 7 as well as any excess acid remaining on the ribbon 1. The washed ribbon 1 is then guided over a pair of guide rolls 44, 45 through an alcohol rinse bath 24 in the tank 25 to cause absorption by the alcohol of any rinse water remaining on the ribbon 1. From the alcohol rinse tank 25, the ribbon 1 is then guided over a guide roll 46 past a pair of air jets 47 directed against the opposite flat sides of the ribbon 1 by a pair of air nozzles 48 to effect the thorough drying of the ribbon. From the guide roll 46, the dried metal foil ribbon 1 may either be wound onto a takeup spool 49 which may be suitably rotated to effect the withdrawal of the ribbon 1 off the supply spool 31 and its advance movement through the tanks 8, 23 and 25 and onto which spool 49 the ribbon 1 may be guided by a pair of guide rolls 50 between which the ribbon passes, for subsequent severing of the coiled ribbon 1 into individual foil leads 26, as needed, or the ribbon 1 may be fed by the rolls 50, acting as feed rolls, to a severing mechanism (not shown) for cutting the ribbon 1 along the transverse cutting planes 27 (FIG. 6) into individual foil leads 26. If desired, prior to the cutting of each foil lead 26 off the advancing end of the ribbon 1, one or the other of the inner or outer wire leads 28 and 29 may be welded to the welding plateau 16 on the free end of the ribbon 1.

The above-described continuous process according to the invention for fabricating a shaped metal foil ribbon 1 of the configuration as shown and described in connection with FIG. 6 and subsequently severing the shaped ribbon 1 into individual foil leads 26 of the type illustrated in FIGS. 6 to 11, is of particular advantage for the reason that the continued advance movement or travel of the metal foil ribbon 1 through the etching electrolyte bath 7 acts to break up the bubbles which ordinarily tend to form in the etching electrolyte solution 7 during the etching operation and which would partially block the passage of the etching current through the electrolyte and so cause a variation in the rate of etching and therefore the degree of etching of the metal foil ribbon. The breaking up of the bubbles in the etching electrolyte 7 assures a more uniform current flow through the etching electrolyte at all times and thus a more uniform rate of etching of the metal foil ribbon 1. Consequently, greater reproducibility of results in the shape and form of the etched metal foil ribbon 1 and in the individual foil leads 26 to be cut therefrom is afforded by the continuous process according to the invention. In addition, the movement of the metal foil ribbon 1 through the etching electrolyte solution 7 acts to minimize the heating of the electrolyte by the etching current passing therethrough as well as to assure the uniform heating of the electrolyte. Since the etching electrolyte solution 7 becomes more reactive and its etching rate increases the higher its temperature, the minimization of the heating of the electrolyte by the etching current and the maintenance thereof more nearly at a uniform temperature during the etching operation, which conditions are inherent in the continuous process as described above, therefore likewise assures greater reproducibility and uniformity of results in the shape and form of the etched metal foil ribbon 1 and the foil leads 26 which are subsequently cut therefrom.

I claim:

1. The method of making thin metal foil leads for sealing into vitreous material which comprises the steps of forming pairs of opposed notches in the side edges of a ribbon of metal foil at spaced points therealong to divide the ribbon longitudinally into a series of individual foil lead sections joined together at their opposite ends by narrow connecting portions, applying discrete protective coatings of an etch-resistant masking material on at least one side of the metal foil ribbon over localized areas thereof between the opposed notches of each pair thereof, electrolytically etching the metal foil ribbon to feather all the exposed edges of the individual foil lead sections thereof, removing the said protective coatings from the metal foil ribbon, and then transversely severing the metal foil ribbon at each of the said connecting sections thereof to separate the ribbon into individual foil leads.

2. The method as specified in claim 1 wherein the said protective coatings are applied to both sides of the metal foil ribbon.

3. The method as specified in claim 1 wherein the said connecting portions of the metal foil ribbon are band-shaped.

4. The method as specified in claim 3 wherein the said protective masking coatings are applied over each of the said connecting band portions of the metal foil ribbon as well as over localized areas contiguous thereto.

5. The method as specified in claim 1 wherein the said metal foil ribbon consists of molybdenum.

6. The method as specified in claim 1 wherein the said notches in the metal ribbon are substantially U-shaped.

7. The method as specified in claim 1 wherein the said notches in the metal foil ribbon are substantially V-shaped.

8. The method of preparing a continuous ribbon of metal foil for subsequent separation into individual foil leads having feathered edges which comprises the steps of forming pairs of opposed notches in the side edges of a ribbon of metal foil at spaced points therealong to divide the ribbon longitudinally into a series of individual foil lead sections joined together at their opposite ends by narrow connecting portions, applying discrete protective coatings of an etch-resistant masking material on at least one side of the metal foil ribbon over localized areas thereof between the opposed notches of each pair thereof, electrolytically etching the metal ribbon to feather all the exposed edges of the individual foil lead sections thereof, and then removing the said protective coatings from the metal foil ribbon.

9. The method of preparing a continuous ribbon of metal foil for subsequent separation into individual foil leads having feathered edges which comprises the steps of forming pairs of opposed notches in the side edges of a ribbon of metal foil at spaced points therealong to divide the ribbon longitudinally into a series of individual foil lead sections joined together at their opposite ends by narrow connecting portions, applying discrete protective coatings of an etch-resistant masking material on at least one side of the metal foil ribbon over localized areas thereof between the opposed notches of each pair thereof, electrolytically etching the metal foil ribbon to feather its exposed edges by longitudinal passage of the ribbon through an etching electrolyte between and in spaced parallel relation to a pair of elongated spaced electrodes disposed within the electrolyte and electrically connected to respective sides of an AC power supply, and then removing the said protective coatings from the etched portion of the metal foil ribbon.

10. The method as specified in claim 9 wherein the said metal ribbon consists of molybdenum and the said etching electrolyte consists of a solution of sodium hydroxide.

11. The method as specified in claim 10 wherein the said metal foil ribbon, after the electrolytic etching thereof, is successively passed through a neutralizing acid bath and thence through a rinsing bath.